US009595699B2

(12) United States Patent
Kim

(10) Patent No.: US 9,595,699 B2
(45) Date of Patent: Mar. 14, 2017

(54) RECHARGEABLE BATTERY AND MODULE OF THE SAME

(71) Applicants: SAMSUNG SDI CO., LTD., Yongin-si, Gyeonggi-do (KR); ROBERT BOSCH GMBH, Stuttgart (DE)

(72) Inventor: Duk-Jung Kim, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 701 days.

(21) Appl. No.: 13/914,763

(22) Filed: Jun. 11, 2013

(65) Prior Publication Data
US 2014/0193678 A1 Jul. 10, 2014

(30) Foreign Application Priority Data
Jan. 10, 2013 (KR) ........................ 10-2013-0003108

(51) Int. Cl.
*H01M 2/06* (2006.01)
*H01M 10/613* (2014.01)
*H01M 2/20* (2006.01)
*H01M 10/6553* (2014.01)
*H01M 10/647* (2014.01)
*H01M 10/6556* (2014.01)
*H01M 2/30* (2006.01)

(52) U.S. Cl.
CPC ............ *H01M 2/06* (2013.01); *H01M 2/202* (2013.01); *H01M 10/613* (2015.04); *H01M 10/647* (2015.04); *H01M 10/6553* (2015.04); *H01M 10/6556* (2015.04); *H01M 2/30* (2013.01)

(58) Field of Classification Search
None
See application file for complete search history.

(56) References Cited

U.S. PATENT DOCUMENTS

| 2009/0286146 | A1* | 11/2009 | Hansson | ............... | H01M 2/043 |
| | | | | | 429/121 |
| 2011/0104562 | A1* | 5/2011 | Byun | .................... | H01M 2/06 |
| | | | | | 429/181 |
| 2012/0021278 | A1 | 1/2012 | Byun et al. | | |
| 2012/0052341 | A1* | 3/2012 | Kim | .................... | H01M 2/043 |
| | | | | | 429/53 |
| 2012/0129030 | A1* | 5/2012 | Lim | ................... | H01M 2/1077 |
| | | | | | 429/120 |

FOREIGN PATENT DOCUMENTS

| JP | 2009-277378 | 11/2009 |
| JP | 2011-029103 | 2/2011 |
| KR | 10-0956513 B1 | 5/2010 |
| KR | 10-2012-0010092 A | 2/2012 |
| KR | 10-2012-0055241 A | 5/2012 |

* cited by examiner

*Primary Examiner* — Barbara Gilliam
*Assistant Examiner* — Adam A Arciero
(74) *Attorney, Agent, or Firm* — Lee & Morse, P.C.

(57) ABSTRACT

A rechargeable battery includes an electrode assembly that performs charging and discharging; a case in which the electrode assembly is installed; a cap plate coupled to the case; an electrode terminal coupled to a terminal hole of the cap plate; and an insulator between the cap plate and the electrode terminal. The electrode includes a flow path that supplies a cooling fluid to a portion of the electrode terminal coupled with the insulator.

8 Claims, 7 Drawing Sheets

RECHARGEABLE BATTERY AND MODULE OF THE SAME

CROSS-REFERENCE TO RELATED APPLICATION

This application claims priority under 35 U.S.C. §119 to Korean Patent Application No. 10-2013-0003108 filed in the Korean Intellectual Property Office on Jan. 10, 2013, and entitled "RECHARGEABLE BATTERY AND MODULE OF THE SAME," the entire contents of which are incorporated herein by reference.

BACKGROUND

1. Field

Embodiments are directed to a rechargeable battery and a module thereof.

2. Description of the Related Art

Unlike a primary battery, a rechargeable battery iteratively performs charging and discharging. A small-capacity rechargeable battery may be used for small portable electronic devices such as mobile phones, notebook computers, camcorders, and the like, while a large-capacity rechargeable battery may be used as a motor-driving power source for a hybrid vehicle, and the like.

For example, the rechargeable battery includes an electrode assembly including a positive electrode and a negative electrode on respective sides of a separator, a case receiving the electrode assembly, a cap plate coupled to an opening of the case, and an electrode terminal provided in the cap plate and connected to the electrode through a lead tab.

The electrode terminal, for instance, may include a rivet terminal provided in the cap plate and a terminal hole. Thus, the electrode terminal may be electrically connected to the lead tab. The electrode terminal may include a plate terminal provided at an outside of the cap plate and connected to the rivet terminal.

A gasket may be provided between the rivet terminal and the terminal hole. An insulator may be provided between the plate terminal and the cap plate to seal between the electrode terminal and the terminal hole and electrically insulate the electrode terminal and the cap plate.

SUMMARY

Embodiments are directed to a rechargeable battery, including an electrode assembly that performs charging and discharging, a case in which the electrode assembly is installed, a cap plate coupled to the case, an electrode terminal coupled to a terminal hole of the cap plate, and an insulator between the cap plate and the electrode terminal, the electrode terminal including a flow path that supplies a cooling fluid to a portion of the electrode terminal coupled with the insulator.

The cap plate, the insulator, and the electrode terminal may be layered along a height direction of the case. The flow path may penetrate the electrode terminal along the height direction to supply the cooling fluid to an upper surface of the insulator.

The electrode terminal may include a rivet terminal inserted to the terminal hole and a plate terminal connected to the rivet terminal, the plate terminal being on an upper surface of the cap plate in a height direction of the case. The insulator may be between the upper surface of the cap plate and a bottom surface of the plate terminal in the height direction. The flow path may penetrate in the height direction through the plate terminal toward the insulator.

The insulator may include an exhaust groove that connects the flow path to an outside, the exhaust groove providing a space between the plate terminal and the insulator.

The flow path may include an inlet hole formed in an upper end side of the rivet terminal, a first flow path formed at lateral ends, in a length direction of the cap plate, of the inlet hole, a second flow path connected to lateral sides of the first flow path in a width direction of the cap plate, a third flow path connected to the second flow path along the height direction, and an exhaust hole connected to the third flow path along the width direction of the cap plate.

Embodiments are also directed to a rechargeable battery module including a first unit cell and a second unit cell, each being formed of a rechargeable battery including an electrode terminal, a cap plate, and an insulator disposed between the electrode terminal and the cap plate, and a bus bar connecting each electrode terminal respectively provided in each cap plate of the first and second unit cells. The bus bar includes connection paths connected to a flow path provided in each electrode terminal to supply a cooling fluid to a portion of the electrode terminal coupled with the insulator.

The rechargeable battery module may further include a duct mounted to the bus bar to supply the cooling fluid to the connection paths.

The duct may include a receiving groove receiving an upper surface of the bus bar, supply outlet holes provided in the receiving groove, the supply outlet holes being respectively connected to the connection paths, and a supply path connected to the supply outlet holes to supply the cooling fluid to the supply outlet holes.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
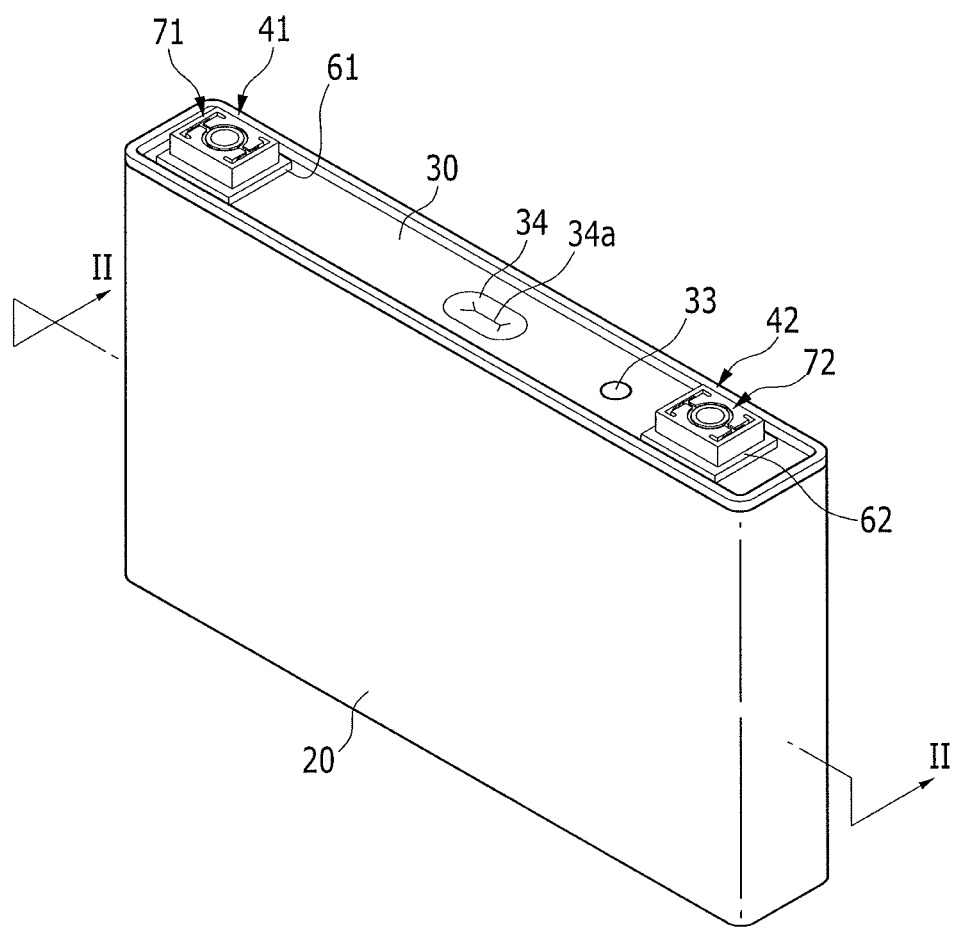
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements may be exaggerated for clarity of illustration. It will also be understood that when an element is referred to as being "on" another element, it can be directly on the other element, or intervening elements may also be present. In addition, it will also be understood that when a elements is referred to as being "between" two elements, it can be the only element between the two elements, or one or more intervening elements may also be present. Like reference numerals refer to like elements throughout.

Figure 2:
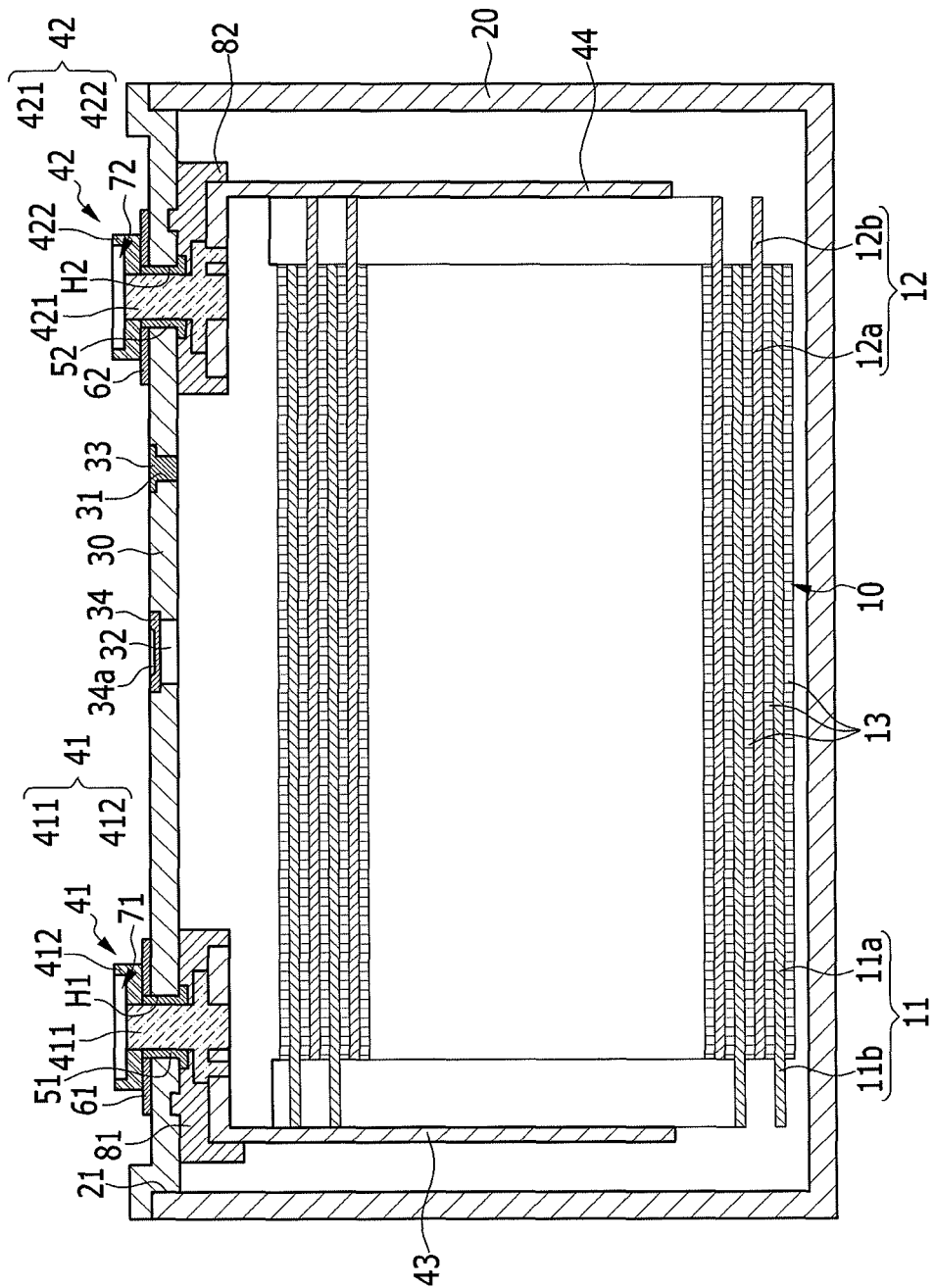
FIG. 2 illustrates a cross-sectional view of FIG. 1, taken along the line II-II.

FIG. 1 is a perspective view of a rechargeable battery according to an exemplary embodiment and FIG. 2 is a cross-sectional view of FIG. 1, taken along the line II-II.

Referring to FIG. 1 and FIG. 2, a rechargeable battery according to an exemplary embodiment includes an electrode assembly 10 iteratively performing charging and discharging, a case 20 in which the electrode assembly 10 and an electrolyte solution is installed, a cap plate coupled to an opening 21 of the case 20, and electrode terminals 41 and 42 installed in the cap plate 30.

The rechargeable battery further includes gaskets 51 and 52 sealing between the electrode terminals 41 and 42 and the cap plate 30 and insulators 61 and 62 insulating between the electrode terminals 41 and 42 and the cap plate 30. The electrode terminals 41 and 42 include flow paths 71 and 72 through which a cooling fluid is supplied to a portion where the electrode terminals 41 and 42 and the insulators 61 and 62 are coupled to each other.

For example, the electrode assembly 10 includes electrodes, that is, a negative electrode 11 and a positive electrode 12 disposed at both sides of a separator 13, which is an electric insulator, and is formed by winding the negative electrode 11, the separator 13, and the positive electrode 12 in a jelly roll state.

Further, the electrode assembly may be assembled by laminating a negative electrode and a positive electrode each of which is formed by a single plate with the separator interposed therebetween. In another embodiment, the electrode assembly may be assembled by bending and laminating the negative electrode, the separator, and the positive electrode in a zigzag manner (not shown).

The negative electrode 11 and the positive electrode 12 include coated regions 11a and 12a, formed by coating an active material onto a current collector of each of the electrodes 11 and 12, and uncoated regions 11b and 12b, which are portions of current collector that are not coated with the active material. The uncoated regions 11b and 12b are at one side of each of the electrodes 11 and 12. The current collector of the negative electrode 11 may be formed of a copper thin film and the current collector of the positive electrode 12 may be formed of an aluminum thin film, as examples.

The uncoated region 11b of the negative electrode 11 is formed at one end of the negative electrode 11 along the coated region 11a of the spirally wound negative electrode 11. The uncoated region 12b of the positive electrode 12 is formed at one end of the positive electrode 12 along the coated region 12a of the spirally wound positive electrode 12. That is, the uncoated regions 11b and 12b are respectively disposed at opposing ends of the electrode assembly 10 for enabling electric connection.

The case 20 includes an opening 21 at one side (i.e., an upper side in the height direction in FIG. 1 and FIG. 2). The opening 21 enables the insertion of the electrode assembly 10 through the opening 21. The case 20 may be formed in the shape of a cuboid, as an example, to form a receiving space for the electrolyte solution.

The cap plate 30 is coupled to the opening 21 of the case 20 to provide a sealed receiving space within the case 20. When the case 20 and the cap plate 30 are made of a same material, for example, aluminum and the case 20 and the cap plate 30 are coupled by welding, excellent weldability may be achieved.

The cap plate 30 may include an electrolyte injection opening 31 and a vent hole 32. The electrolyte injection opening 31 may enable the injection of the electrolyte solution into the case 20 after the cap plate 30 is coupled to the case 20. After the injection of the electrolyte solution, electrolyte injection opening 31 may be sealed by a sealing cap 33.

The vent hole 32 emits a gas generated in the rechargeable battery due to charging and discharging operations to the outside of the rechargeable battery to prevent explosion of the rechargeable battery. The vent hole 32 may be sealed by a vent plate 34 welded thereto.

When the internal pressure of the rechargeable battery reaches a predetermined level, the vent plate 34 is ruptured. A notch 34a formed in the vent plate 34 may induce the rupture of the vent plate 34. When the vent plate 34 is ruptured and the vent hole 32 is thereby opened, the internal gas of the rechargeable battery is emitted to the outside.

The cap plate 30 includes terminal holes H1 and H2 penetrating the case 20 to electrically connect the inside and the outside of the case 20. The electrode terminals 41 and 42 are respectively installed in the terminal holes H1 and H2 of the cap plate 30 and thus respectively connected to the electrode assembly 10 through lead tabs 43 and 44. The electrode terminals 41 and 42 have conductivity and are respectively connected to the negative and positive electrodes 11 and 12 of the electrode assembly 10.

The electrode terminals 41 and 42 may include rivet terminals 411 and 421 and plate terminals 412 and 422. The rivet terminals 411 and 421 are inserted into the terminal holes H1 and H1 at a lower side of the cap plate 30, and protrude to inner and outer sides of the cap plate 30.

The plate terminals 412 and 422 are connected to external side ends of the rivet terminals 411 and 421 by riveting at an upper side of the cap plate 30. The plate terminals 412 and 422 may be welded by a bus bar 90 (refer to FIG. 5) to enable serial or parallel connection of neighboring unit cells 101 and 102 respectively formed as rechargeable batteries.

The electrode terminals 41 and 42 and the lead tabs 43 and 44 are respectively connected with each other in an inner side of the cap plate 30. That is, the lead tabs 43 and 44 can be electrically and mechanically connected to the electrode terminals 41 and 42 by being fitted to lower ends of the rivet terminals 411 and 421 and by caulking the lower ends of the rivet terminals 411 and 421.

Meanwhile, internal insulators 81 and 82 support the lead tabs 43 and 44 and the rivet terminals 411 and 421 electrically connected in the inner side of the cap plate 30 with respect to the cap plate 30 in an insulated manner.

Gaskets 51 and 52 may be inserted between the electrode terminals 41 and 42 and interior circumferences of the terminal holes H1 and H2. The gaskets 51 and 52 may be provided between exterior circumferences of the rivet terminals 411 and 421 and the interior circumferences of the terminal holes H1 and H2 to seal between the rivet terminals 411 and 421 and the terminal holes H1 and H2 and electrically insulate the rivet terminals 411 and 421 and the terminal holes H1 and H2.

In addition, the insulators 61 and 62 are provided between the cap plate 30 and the electrode terminals 41 and 42 at an external side of the gaskets 51 and 52. The insulators 61 and 62 may be provided between an upper surface of the cap plate 30 and lower surfaces of the plate terminals 412 and 422 to electrically insulate and seal between the cap plate 30 and the plate terminals 412 and 422.

Figure 3:
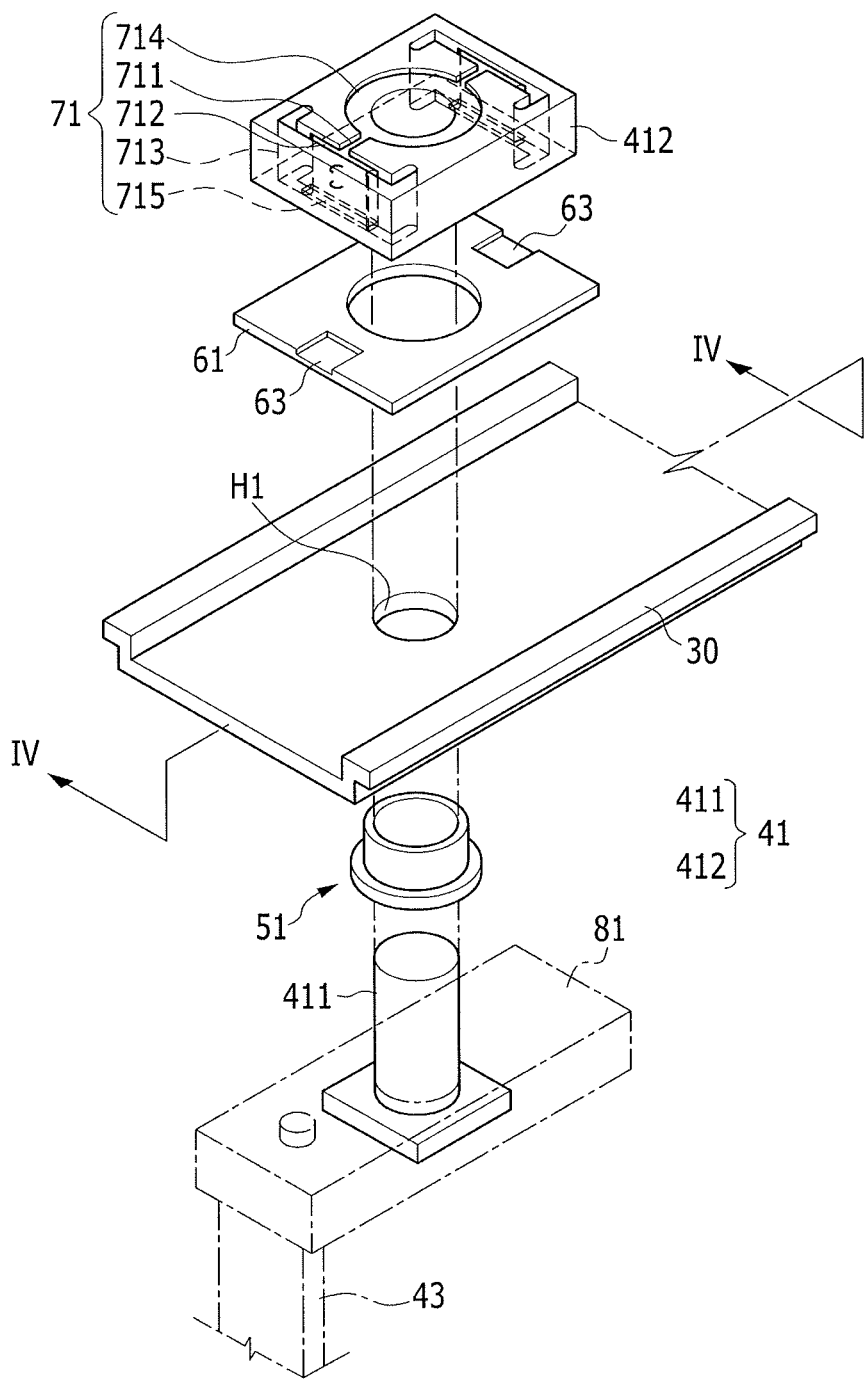
FIG. 3 illustrates an exploded perspective view of an assembled portion of a cap plate and an electrode terminal.
Figure 4:
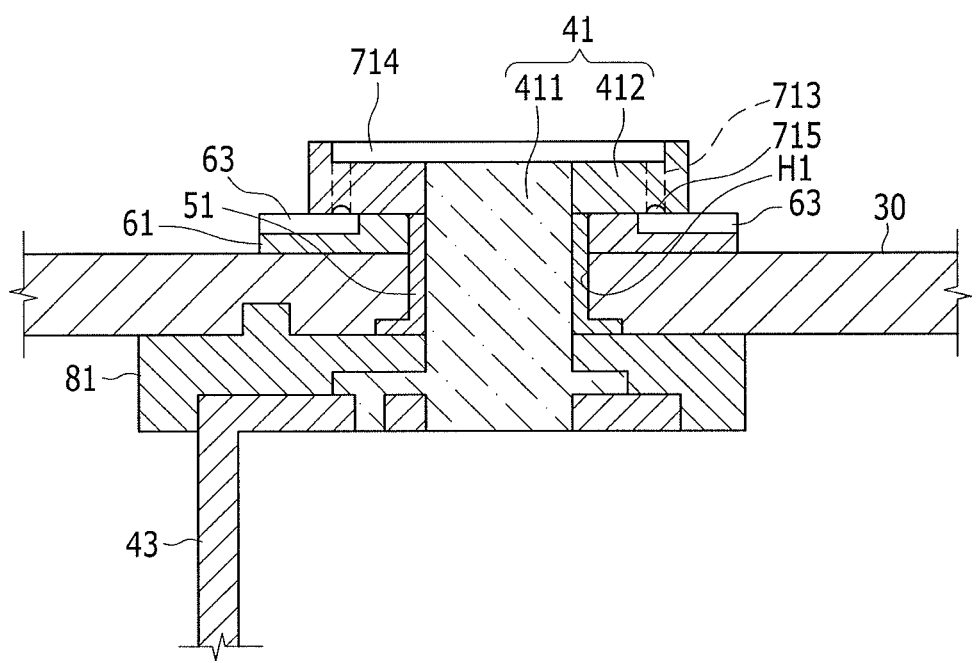
FIG. 4 illustrates a cross-sectional view of FIG. 3, taken along the line IV-IV.

FIG. 3 is an exploded perspective view of an assembled portion of the cap plate 30 and the electrode terminals 41 and 42, and FIG. 4 is a cross-sectional view of FIG. 3, taken along the line IV-IV.

The assembly structures of the electrode terminals 41 and 42 with respect to the cap plate 30 may be the same. Accordingly, the assembly structure of the electrode terminal 41 connected to the negative electrode 11 will exemplarily described and it is to be understood that such description may also apply to the electrode terminal 42 and negative electrode 42.

The flow path 71 is formed in the electrode terminal 41 to supply a cooling fluid to the insulator 61. Referring to FIG. 3 and FIG. 4, the cap plate 30, the insulator 61, and the electrode terminal 41 may be layered in a height direction of the case 20. The flow path 71 penetrates the electrode terminal 41 along the height direction to cool the insulator 61 by supplying the cooling fluid to the upper surface of the insulator 61.

The insulator 61 is installed between the upper surface of the cap plate 30 and the bottom surface of the plate terminal 412 in the height direction. The flow path 71 is formed to penetrate the plate terminal 412 along the height direction and thus to supply the cooling fluid toward the upper surface of the insulator 61, which faces the bottom surface of the plate terminal 412.

The insulator 61 includes exhaust grooves 63 connected to the flow path 71 formed in the plate terminal 412. The exhaust grooves 63 are connected to the outside between the plate terminal 412 and the insulator 61 that face each other. A low temperature cooling fluid may be continuously supplied by emitting the cooling fluid that has been supplied through the flow path 71 and thus has been heated to a high temperature while cooling the insulator 61.

The flow path 71 may include an inlet hole 714, a first flow path 711, a second flow path 712, a third flow path 713, and an outlet hole 715 that are connected with each other. The inlet hole 714 may be formed in an upper end of the rivet terminal 411 to take in a low-temperature cooling fluid. The inlet hole 714 may have a larger diameter than that of the rivet terminal 411 for inflow of a large amount of cooling fluid.

The first flow path 711 may be formed at both sides in a length direction of the cap plate 30 from the inlet hole 714 to induce the cooling fluid that has flowed into the inlet hole 714 to flow in the length direction of the cap plate 30.

The second flow path 712 may be connected to lateral sides in a width direction of the cap plate 30 to the first flow path 711. The second flow path 712 may include the cooling fluid induced to the first flow path 711 to flow toward the lateral sides in the width direction of the cap plate 30.

The third flow path 713 may be connected along a height direction of the case 20 to the second flow path 712. The third flow path 713 may cool the insulator 61 by inducing the cooling fluid induced to the second flow path 712 to flow toward the insulator 61.

In addition, an outlet hole 715 may be connected along the width direction of the cap plate 30 in the third flow path 713. The outlet hole 715 may cool the insulator 61 while inducing the cooling fluid induced to the third flow path 713 to flow toward a width directional center of the cap plate 30.

As described, the first, second, and third flow paths 711, 172, and 713 supply a low-temperature cooling fluid provided through the inlet hole 714 to the upper surface of the insulator 61 through the outlet hole 715 to evenly cool the insulator 61 in the width direction.

The flow path 71 formed in the electrode terminal 41 may effectively cool the insulator 61 disposed in a portion where the electrode terminal 41 and the cap plate 30 are mechanically and electrically connected with each other. Deterioration of the insulation 61 may be suppressed.

The exhaust groove 63 connects a space between the plate terminal 412 and the insulator 61, which are connected to the outlet hole 715 and thus face each other to the outside along a length direction of the cap plate 30.

The cooling fluid is supplied to the inlet hole 714 and then emitted to the outside through the electrode terminal 41 and the insulator 61 via the first, second, and third flow paths 711, 712, 713, and the outlet hole 715. The low-temperature cooling fluid can iteratively perform a process of cooling a heated portion and then being emitted to the outside.

When the outlet hole 715 is formed over the width direction of the cap plate 30, the exhaust groove 63 may be formed to be smaller than the outlet hole 715 in the width direction of the cap plate 30. Thus, the exhaust groove 63 may not deteriorate an electric insulating characteristic of the insulator 61 while emitting the cooling fluid to the outside.

Figure 5:
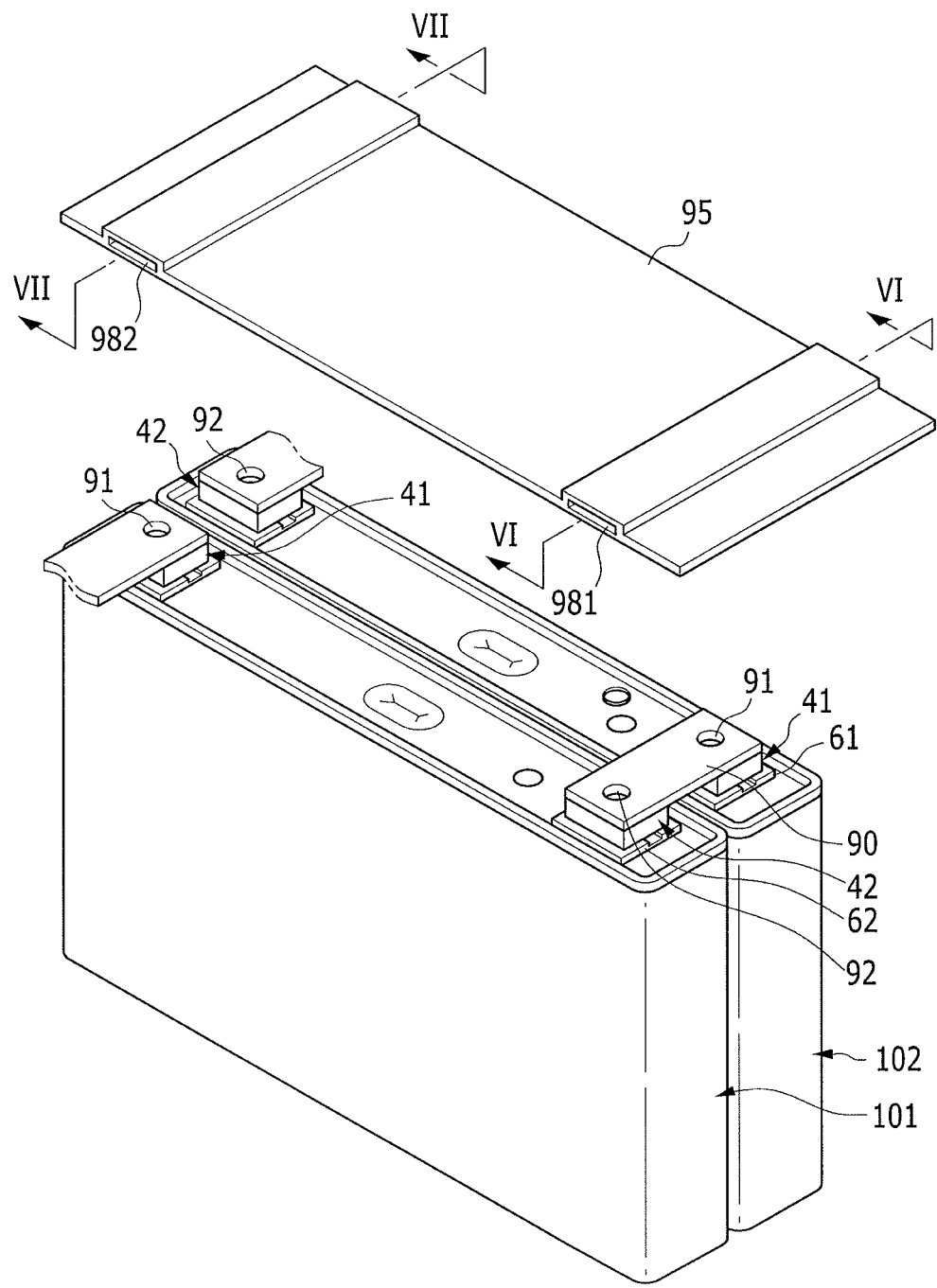
FIG. 5 illustrates an exploded perspective view of a rechargeable battery module including the rechargeable battery of FIG. 1.
Figure 6:
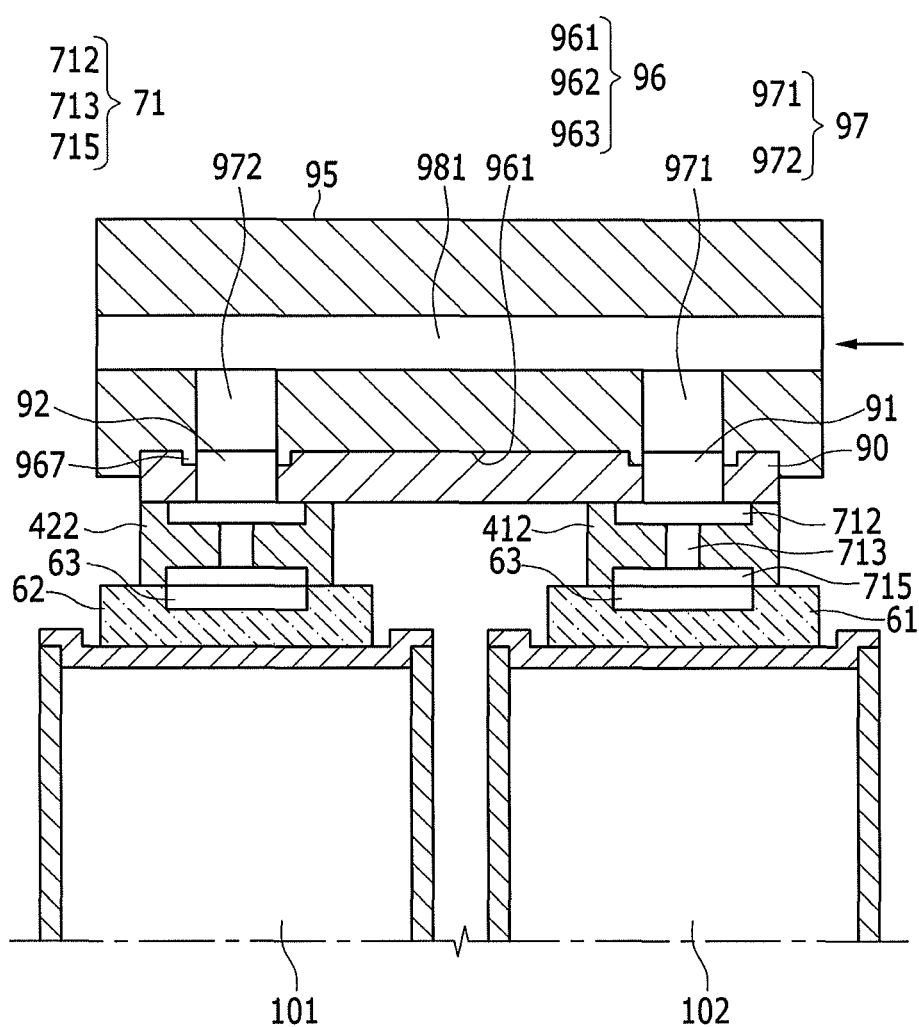
FIG. 6 illustrates a cross-sectional view of FIG. 5, taken along the line VI-VI.
Figure 7:
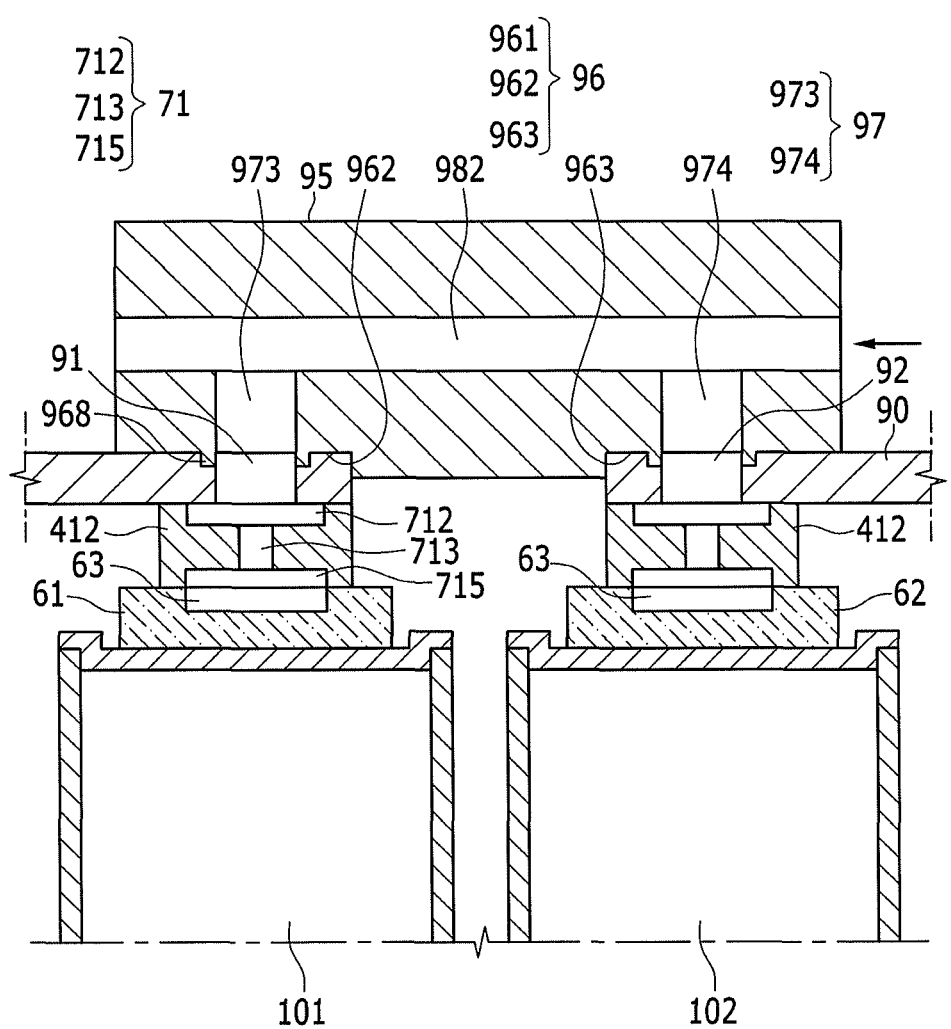
FIG. 7 illustrates a cross-sectional view of FIG. 5, taken along the line VII-VII.

FIG. 5 is an exploded perspective view of a rechargeable battery module including the rechargeable battery of FIG. 1, FIG. 6 is a cross-sectional view of FIG. 5, taken along the line VI-VI, and FIG. 7 is a cross-sectional view of FIG. 5, taken along the line VII-VII.

A rechargeable battery module can be formed using the rechargeable battery shown in FIG. 1 to FIG. 4 as a unit cell. For convenience, referring to FIG. 5 to FIG. 7, a rechargeable battery module is formed by serially coupling a first unit cell 101 and a second unit cell 102 with a bus bar 90.

The bus bar 90 may be provided with connection paths 91 and 92 that are respectively connected to the flow paths 71 and 72 that are provided in the plate terminals 412 and 422. The connection paths 91 and 92 supply the cooling fluid to coupling portions of the plate terminals 412 and 422 and the insulators 61 and 62 by supplying the cooling fluid to the inlet hole 714 of the electrode terminals 41 and 42.

When the bus bar 90 is formed in the upper surface of the plate terminals 412 and 422 by welding, the connection paths 91 and 92 enable the supplying of the cooling fluid to the inlet hole 714 of the plate terminals 412 and 422.

The rechargeable battery module may be further provided with a duct 95 that supplies the cooling fluid to the connection paths 91 and 92 of the bus bar 90. The duct 95 may include a receiving groove 96, a supply outlet hole 97, and a supply path 98.

The receiving groove 96 may include receiving grooves 961, 962, and 963 that receive an upper surface of the bus bar 90. The receiving groove 961 in one side (refer to FIG. 6) may be formed to wholly receive one bus bar 90. The receiving grooves 962 and 963 in the other side (refer to FIG. 7) may be formed to receive ends of each of two different bus bars 90. The receiving grooves 961, 962, and 963 may effectively allow the cooling fluid supplied to the duct 95 to be supplied to the connection paths 91 and 92 of the bus bar 90 without a loss of the cooling fluid.

In the present exemplary embodiment, two unit cells 101 and 102 are exemplarily illustrated, but the rechargeable battery module can include more than two unit cells by iteratively providing the structure of the present exemplary embodiment.

Referring to FIG. 6, the supply outlet hole 97 may include supply outlet holes 971 and 972 respectively connected to the connection paths 92 and 91 and corresponding to one bus bar 90. The supply outlet holes 972 and 971 may be connected to the receiving groove 961 and supply the cooling fluid to the connection paths 92 and 91 of the bus bar 90. The receiving groove 961 may be provided with protrusions 967 that extend to the supply outlet holes 972 and 971. The protrusions 967 may be coupled to the connection paths 92 and 91 of the bus bar 90 so that a coupling force between the duct 95 and the bus bar 90 may be improved.

Referring to FIG. 7, the supply outlet hole 97 may further include supply outlet holes 973 and 974 respectively connected to the connection paths 91 and 92 and corresponding to ends of each of two different bus bars 90. The supply outlet holes 973 and 974 may be respectively connected to the receiving grooves 962 and 963 and may supply the cooling fluid to the connection paths 91 and 92 of the bus bar 90. The receiving grooves 962 and 963 may be provided with protrusions 968 that extend to the supply outlet holes 973 and 974. The protrusions 968 may be coupled to the connection paths 91 and 92 of the bus bar 90 so that a coupling force between the duct 95 and the bus bar 90 may be improved.

A supply path 98 may be connected to the supply outlet hole 97 to supply the cooling fluid. For example, the supply path 98 may include a first supply path 981 that supplies the cooling fluid to one bus bar 90 and a second supply path 982 that supplies the cooling fluid to ends of the other two bus bars 90.

The first supply path 981 may connect the supply outlet holes 971 and 972 of one bus bar 90 to supply the cooling fluid, and the second supply path 982 may connect the supply outlet holes 973 and 974 to the ends of the two bus bars 90 to supply the cooling fluid.

The duct 95 and the supply path 98 may be extended to correspond to the number of electrically connected first and second unit cells 101 and 102 for uniform heat dissipation in the unit cells.

By way of summation and review, a rechargeable battery may use an air cooling method such that only external surfaces of the cap plate and the case are cooled. Thus, heat generation elements in electrical and mechanical portions in the rechargeable battery may not be cooled.

In contrast, embodiments provide a rechargeable battery in which a heat generation element in an electrical and mechanical coupling portion, and, in particular, a sealing portion between a cap plate and an electrode terminal, is effectively cooled. A rechargeable battery module includes a plurality of unit cells, each formed of the rechargeable battery.

According to an embodiment, a flow path is formed in an electrode to supply a cooling fluid to a portion where electrode terminals are coupled with each other, to thereby cool a heat generation element in an electrical and mechanical coupling portion.

In addition, the cooling fluid can be supplied to the insulator by forming a flow path in the electrode terminal to effectively cool the insulator that seals the cap plate and the electrode terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising
an electrode assembly that performs charging and discharging;
a case in which the electrode assembly is installed;
a cap plate coupled to the case;
an electrode terminal coupled to a terminal hole of the cap plate; and
an insulator between the cap plate and the electrode terminal,
the electrode terminal including a flow path that supplies a cooling fluid to a portion of the electrode terminal coupled with the insulator,
wherein the flow path penetrates the electrode terminal in a height direction of the case and supplies the cooling fluid to an upper surface of the insulator in the height direction, and
wherein the cooling fluid directly contacts a portion of the upper surface of the insulator.

2. The rechargeable battery as claimed in claim 1, wherein:
the cap plate, the insulator, and the electrode terminal are layered along the height direction of the case.

3. The rechargeable battery as claimed in claim 1, wherein:
the electrode terminal includes a rivet terminal inserted to the terminal hole and a plate terminal connected to the rivet terminal, the plate terminal being on an upper surface of the cap plate in the height direction of the case, and
the insulator is between the upper surface of the cap plate and a bottom surface of the plate terminal in the height direction.

4. The rechargeable battery as claimed in claim 3, wherein the insulator includes an exhaust groove that connects the flow path to an outside of the rechargeable battery, the exhaust groove providing a space between the plate terminal and the insulator.

5. The rechargeable battery as claimed in claim 4, wherein the flow path includes:
an inlet hole formed in an upper end side of the rivet terminal;
a first flow path formed at lateral ends, in a length direction of the cap plate, of the inlet hole;
a second flow path connected to lateral sides of the first flow path in a width direction of the cap plate;
a third flow path connected to the second flow path along the height direction; and
an exhaust hole connected to the third flow path along the width direction of the cap plate.

6. A rechargeable battery module, comprising:
a first unit cell and a second unit cell, each being formed of a rechargeable battery including an electrode terminal, a cap plate, and an insulator disposed between the electrode terminal and the cap plate; and
a bus bar connecting each electrode terminal respectively provided in each cap plate of the first and second unit cells,
wherein the bus bar includes connection paths connected to a flow path provided in each electrode terminal to supply a cooling fluid to a portion of the electrode terminal coupled with the insulator, wherein the flow path penetrates the electrode terminal in a height direction of the respective unit cell and supplies the cooling fluid to an upper surface of the insulator in the height direction, and wherein the cooling fluid directly contacts a portion of the upper surface of the insulator.

7. The rechargeable battery module as claimed in claim 6, further comprising a duct mounted to the bus bar to supply the cooling fluid to the connection paths.

8. The rechargeable battery module as claimed in claim 7, wherein the duct includes a receiving groove receiving an upper surface of the bus bar, supply outlet holes provided in the receiving groove, the supply outlet holes being respectively connected to the connection paths, and a supply path connected to the supply outlet holes to supply the cooling fluid to the supply outlet holes.

* * * * *